No. 680,822. Patented Aug. 20, 1901.
A. UREN.
LOGGING HOOK OR DOG.
(Application filed May 22, 1900.)

(No Model.)

WITNESSES:
Emily H. Adams
Otis M. Moore

INVENTOR.
Andrew Uren
BY Frank E. Adams
ATTORNEY.

UNITED STATES PATENT OFFICE.

ANDREW UREN, OF SEATTLE, WASHINGTON.

LOGGING HOOK OR DOG.

SPECIFICATION forming part of Letters Patent No. 680,822, dated August 20, 1901.

Application filed May 22, 1900. Serial No. 17,577. (No model.)

*To all whom it may concern:*

Be it known that I, ANDREW UREN, a citizen of the United States of America, and a resident of Seattle, in the county of King and State of Washington, have invented certain new and useful Improvements in Hooks or Dogs Employed in Logging, of which the following is a specification.

My invention relates to improvements in hooks or dogs which are employed in logging, and has special reference to that class of hooks or dogs which are driven into the log and connect with a chain or like line by which the log is drawn; and I have for the objects of my invention to provide a device of this class which can be readily driven into and withdrawn from the log and which shall embody essential features of simplicity, durability, and general efficiency.

The above and other desirable objects I attain by the construction disclosed on the accompanying drawings and set forth in the following specification.

Figure 1:
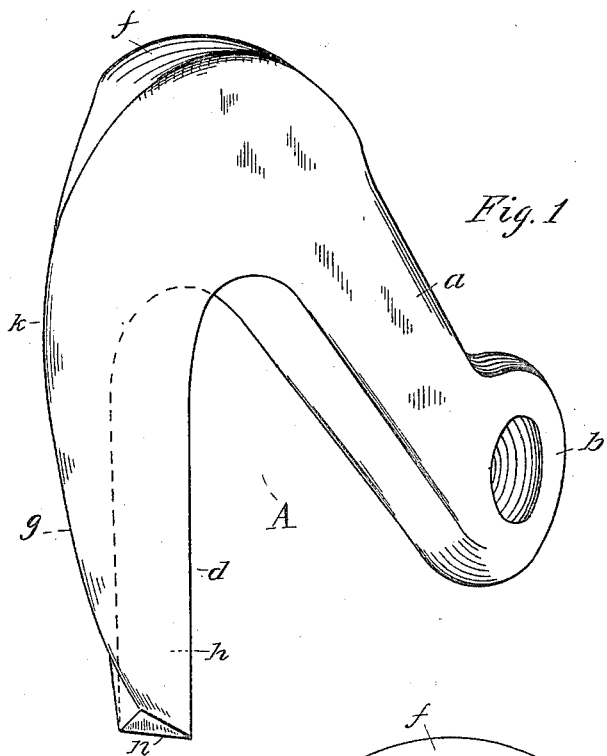
Figure 3:
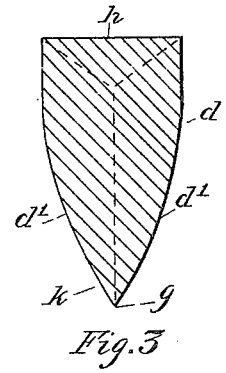
Figure 4:
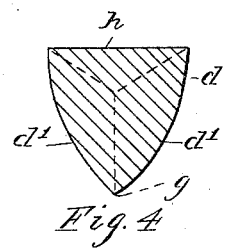
Figure 2:
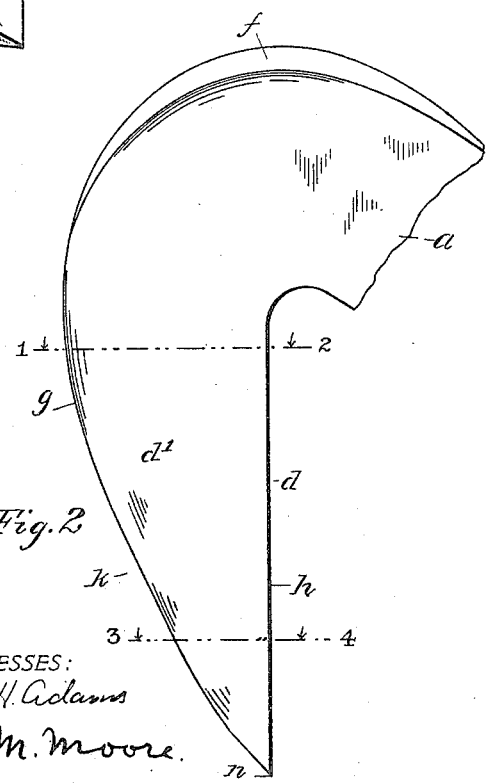

With reference to the accompanying drawings, forming a part of this specification, Figure 1 is a perspective view of my improved logging hook or dog. Fig. 2 is a side elevation of the bill thereof broken from the shank. Fig. 3 is a transverse section of the bill portion thereof, taken on line 1 2 of Fig. 2; and Fig. 4 is a similar section taken on line 3 4 of the same figure.

Like characters of reference designate corresponding parts throughout the several views of the drawings.

The reference character A indicates my improved hook or dog, which is preferably produced with the usual form of shank, as $a$, terminated at one extremity in an eye, as $b$, also produced in the customary form. At the opposite extremity of the shank $a$ from the eye $b$ is formed the bill $d$ of the hook or dog. This bill $d$ is conveniently shaped with a substantially wide face $h$, disposed at right angles to the line of draft exerted on the hook or dog when employed in drawing logs and is preferably in substance of the same construction as in the ordinary hook or dog employed in like fields of operation.

The head $f$ of the hook or dog is preferably shaped to provide what is commonly known as a "mallet-head," having its side edges slightly flaring, whereby the head is of greater width than the thickness of the shank $a$, as clearly shown in Fig. 1.

The back $k$ of the bill $d$ is formed with a sharp edge $g$, which preferably extends upwardly from a point closely adjacent the nose $n$ and diverges outwardly from the face $h$ in a substantially elliptical curve and terminates at the bend of the hook or dog, which forms the head $f$. The side surfaces $d'$ of the bill are preferably formed convex and are made to converge outwardly from the face $h$ and to intersect to form the sharp edge $g$, as clearly indicated in Figs. 3 and 4. The nose $n$ of the bill is preferably formed by producing a flat surface diverging upwardly from the lower edge of the face $h$, whereby a substantially V-shaped edge is formed, which renders the bill easier of penetration and also cuts the timber to form the contact-surface for the face $h$ of the bill as the side surfaces $d'$ of the back cleave the grain, facilitated by the sharp edge $g$, as hereinafter more fully set forth.

By forming a sharp edge, as $g$, on the bill of the hook or dog I provide a device of this class which is more easily driven into and withdrawn from the log, as this edge separates or splits the grain of the wood and permits the sides $d'$ of the bill to more readily cleave same, whereby the back portion of the bill is made to enter between the grain of the wood, while the nose $n$ thereof cuts a substantially smooth surface for the face $h$ of the bill to bear upon, thereby leaving the grain on this surface practically undisturbed for the more perfect contact of said face, and consequently increasing the holding qualities of the hook, while reducing the mutilation of the timber to a minimum. Furthermore, the resistance to driving and withdrawing is reduced to a minimum, and the usefulness of the device is thereby indefinitely prolonged and the time and labor consumed in entering and detaching the hook or dog is materially decreased.

As logging-dogs have been heretofore constructed the sides of the bill have been flat or slightly concave, whereby when the front face of the bill has been struck preparatory to removing the dog from the water-soaked log the bill has merely cut into the log, the side faces thereof lying against the wood, and the suction between these faces and the wood has rendered the withdrawal difficult, the bills being frequently broken in such operation. By providing the bill with convex sides, as in my invention, when the bill is struck as above indicated it moves forwardly and separates the wood, and the wood at the sides of said bill touching the bill sides at only the outer points of the curves all suction is avoided and the bill is readily withdrawn.

This hook or dog is very readily detached or withdrawn from engagement with the log by simply tapping or prying upwardly on the shank $a$, which action forces the sharp edge $g$ and sides $d'$ still deeper into the timber without sinking the nose $n$, and thus increases slightly the length of the hole as the side surfaces $d'$ spread the grain at the back of this hook or dog, when the device can be readily withdrawn by reason of the enlargement of the hole. I am also enabled to strengthen the hook or dog by increasing the depth of the bill from face to back, which is especially essential adjacent the nose thereof, as the ordinary hook or dog of this class is oftentimes rendered useless by a breakage of the bill near this point; but it has heretofore been impossible to remedy this defect, owing to the form in which the ordinary device is produced, which prohibits any material increase in the thickness of the metal adjacent the nose without materially decreasing the efficiency of the hook or dog, as its resistance to insertion in the log is thereby increased and a rough ragged hole produced.

By the construction heretofore described I am enabled to produce a hook or dog which is materially stronger in the bill than the ordinary device of this class, as the sharp edge provided along the back thereof permits of an increase of the thickness of the bill from face to back and still decreases the resistance in driving and withdrawing, and, furthermore, insures a more perfect contact of the face of the bill when driven into the log, and thereby increases the holding qualities of the device.

The hook or dog, as above described, is produced by forging it to the desired shape or by finishing the shank and eye and the face of the bill under the hammer and bringing the back of the bill to a rough finish, when the desired contour is given to the side surfaces of the bill and the edge of the back and nose thereof brought to the desired degree of sharpness by grinding.

Having thus described my invention, what I claim, and desire to secure by Letters Patent, is—

1. A logging-dog provided with a log-entering bill portion having a convex side.
2. A logging-dog provided with a log-entering bill portion having convex sides.
3. A logging-dog provided with a log-entering bill portion having sides which meet in a sharp edge at the rear of the said bill, one of said sides being convex.
4. A logging-dog provided with a log-entering bill portion having convex sides which meet in a sharp edge.
5. A device of the class described having the log-entering bill portion thereof formed with convex side surfaces converging outwardly from the face and meeting in a sharp edge extending upwardly and diverging from said face in a curve from a point adjacent the nose to the head of said bill.
6. A device of the class described having the log-entering bill portion thereof formed with a wide face and convex side surfaces converging outwardly from the edges thereof and meeting in a sharp edge extending upwardly and diverging from said face in a curve from a point adjacent the nose to the head of said bill, and a surface diverging upwardly from the lower edge of said face to form therewith a substantially V-shaped nose.
7. A device of the class described having the bill portion thereof formed with a wide face and convex side surfaces converging outwardly from the side edges thereof and terminated in a sharp edge extending upwardly and diverging from said face in a substantially elliptical curve from a point closely adjacent the nose to the head of said bill, and a smooth surface diverging upwardly from the lower edge of said face to form therewith a substantially V-shaped nose.

Signed by me at Seattle, Washington, this 16th day of May, 1900.

ANDREW UREN.

Witnesses:
W. PARRY SMITH,
C. A. MCKENZIE.